United States Patent

[11] 3,555,172

[72] Inventor Alfred Heinz
Flemington, N.J.
[21] Appl. No. 745,332
[22] Filed July 16, 1968
[45] Patented Jan. 12, 1971
[73] Assignee Western Electric Company, Incorporated
New York, N.Y.
a corporation of New York

[54] TELEVISION SYSTEM FOR CHECKING MASK REGISTRATION

7 Claims, 7 Drawing Figs.

[52] U.S. Cl. .......... 178/5.2, 96/36.2, 178/6
[51] Int. Cl. .......... H04n 9/32
[50] Field of Search .......... 178/5.2, 6IND, (inquired); 356/172; 96/36.2, (Inquired)

[56] References Cited

UNITED STATES PATENTS 2,594,382 4/1952 Bedford .......... 178/5.2

*Primary Examiner*—Robert L. Griffin
*Assistant Examiner*—Barry Leibowitz
*Attorneys*—H. J. Winegar, R. P. Miller and W. M. Kain

ABSTRACT: A method and system in which a plurality of photographic masks comprising a set are individually mounted, spaced from one another, upon a platform. The surface of each of the masks is illuminated with a light of a different color and a television camera, which is mounted above each mask, generates an electronic signal indicative of the appearance of the pattern on each mask. The video signals from the cameras are sampled by sequentially connecting the cameras to the input terminal of a color television monitor which corresponds to the color of light which is illuminating the associated mask. The monitor displays a composite, multicolored image of all the mask patterns in a set which clearly shows any misalignment of registration of the respective patterns on the masks.

PATENTED JAN 12 1971 3,555,172

SHEET 1 OF 2

INVENTOR
A. HEINZ

BY R. P. Miller
ATTORNEY

TELEVISION SYSTEM FOR CHECKING MASK REGISTRATION

BACKGROUND OF THE INVENTION

1. Field of the Invention

The invention relates to the inspection and checking for registration of masks used in the manufacture of semiconductors and more particularly to methods and systems for displaying on a single color television screen, distinct superimposed color patterns indicative of indicia on a multitude of masks, together with facilities for shifting the masks to display other superimposed color patterns indicative of other indicia on the masks.

Generally, in the manufacture of semiconductor devices, such as transistors, a plurality of devices are simultaneously processed on a single silicon or germanium wafer. Upon completion of the processing of the devices, the wafer is broken up to separate the individual devices into discrete transistors.

A number of the different manufacturing steps commonly employed in the group processing of transistors requires the formation of a photoresist pattern on the surface of the wafer. Such patterns are formed by applying a layer of photoresist material to the surface of the wafer, placing a photographic mask over the layer of photoresist and exposing the layer to ultraviolet light through the mask. A pattern of opaque areas on the generally transparent mask shields selected areas of the photoresist from exposure to the ultraviolet light so that when the layer of photoresist is photographically developed the shielded areas are removed to expose selected areas of the wafer surface. This process permits chemical treatment of the exposed areas of the wafer, such as etching or diffusion, without affecting other areas of the wafer.

As different process steps involve different areas of the semiconductive wafer, layers of photoresist material are applied to the wafer and subsequently removed many times during the manufacture of a transistor. So that each processed area will "match up" and be in alignment with previously processed areas, it is absolutely essential that each photoresist pattern be properly positioned with respect to previously formed patterns. Alignment requires, of course, that each mask be properly positioned with respect to the wafer. However, alignment also requires that each mask be capable of masking an area on the wafer surface at a precise location relative to the areas masked by the other masks; that is, the masks, although used successively must have corresponding areas which are registerable, each within the other.

2. Description of the Prior Art

In the past, one solution to the problem of mask registration has been to manufacture a complete "set" of masks to be used only with one another. Each of the masks in a set are made under exactly the same conditions so that error factors, such as those caused by distortion in the lens used to generate the pattern, will be common for all masks in a series and thus less troublesome. This method of insuring exact mask registration is very expensive because if one of the masks in a set is damaged, the entire set may become useless. Other techniques, such as those involving elaborate optical inspection systems, have been used to check mask registration but, due to their complexity and difficulty of use, have proven unsatisfactory.

SUMMARY OF THE INVENTION

In one embodiment of the invention, a method and system are contemplated wherein a plurality of spaced, sets of indicia on a first medium are checked for registration with a plurality of spaced, sets of indicia on a second medium. More particularly, a plurality of masks comprising a set are individually mounted, spaced from one another, upon a platform. The surface of each of the masks is illuminated and a television camera mounted above each mask generates an electronic signal indicative of the appearance of the pattern on each mask. The electronic signals from the cameras are sequentially sampled and used to generate a composite image of all of the masks in a set on a television screen. The displayed image clearly shows any misalignment of registration of the respective patterns on the masks.

Further, facilities may be provided to simultaneously move all the masks to check the registration of other patterns on the masks. In addition, the delineation between the displayed patterns may be enhanced by using a color television system wherein each pattern appears in a distinct color on the display screen.

DESCRIPTION OF THE DRAWING

The nature of the present invention and its various advantages will appear more fully be referring to the following detailed description in conjunction with the appended drawing, in which.

DETAILED DESCRIPTION

Figure 1:
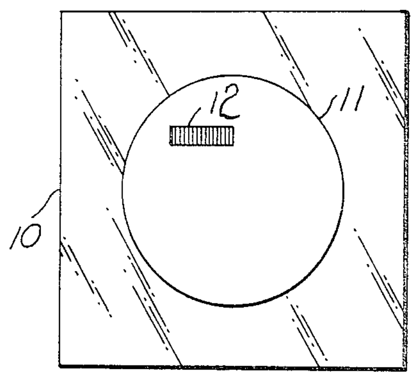
FIG. 1 is a plan view of a semiconductive wafer showing the alignment marks around periphery of the wafer.

Referring to FIG. 1 of the drawing, each of the photographic masks comprises a transparent glass substrate 10 upon which a circular pattern of opaque areas (illustrated by shaded area 11) is deposited. Each of the masks also includes a rectangular alignment mark 12 deposited upon the glass substrate 10 within the circular area 11. This rectangular alignment mark 12 also serves the purpose of shading the semiconductor wafer during the masking process, to generate a conductive region suitable for resistivity measurements needed for diagnostic studies. The alignment mark 12 is deposited upon the substrate 10 at the same time and in an exactly positioned relationship with respect to the pattern 11. That is, if the alignment mark on two superimposed masks were in exact alignment, each of the corresponding areas of the respective patterns on the two masks would also be in exact alignment.

Figure 2:
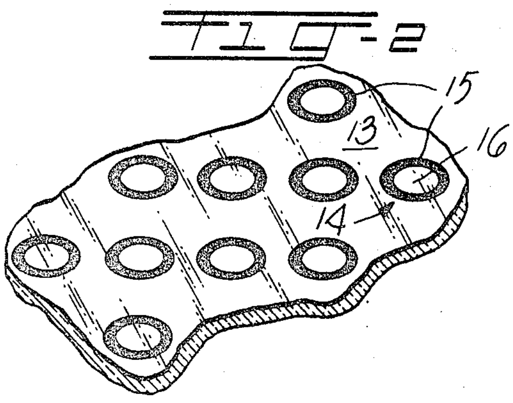
FIGS. 2, 3 and 4 are views of segments of three separate photographic masks which are to be used as a set.
Figure 3:
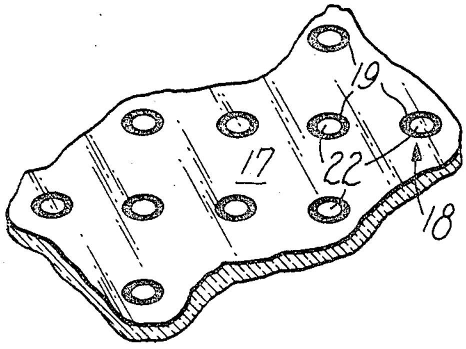
Figure 4:
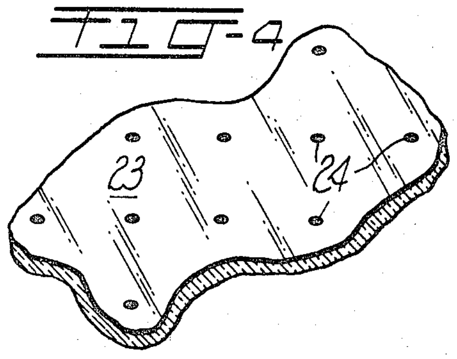

FIGS. 2, 3 and 4 are segments of the opaque patterns of three separate photographic masks which are to be used as a set. FIG. 2 shows the first mask of the set which includes a transparent glass substrate 13 upon which a plurality of indicia 14 are deposited in a predetermined relationship with respect to one another to form a pattern, e.g., a coordinate array.

The indicia 14 may be deposited on the substrate 13 by various means and, although each of the indicia must be generally opaque in order to perform its masking function, the surface of the indicia may be either substantially light absorptive or light reflective. For example, one type of mask may comprise a transparent substrate having indicia formed thereon of a high resolution photographic emulsion such as type 649F spectroscopic emulsion made by the Kodak Corporation. Such photographic emulsions may typically have a spectral reflectivity of less than 10 percent and therefore indicia which are formed from these emulsions will reflect very little of any light impinged upon them for purposes of inspection or checking for registration.

Another example of a different type of mask might be transparent substrate having indicia formed thereon of a material with a highly reflective surface such as, chromium, nickel, silver or aluminum. Each of these materials have a spectral reflectivity approaching 100 percent and also have the property of neutral reflectivity, that is, a substantially constant reflectivity for all wavelengths of light. Indicia formed from such reflective materials would reflect almost all of any light which might be impinged upon them for purposes of mask inspection or checking for registration.

It is also possible that indicia formed of a light absorptive material such as photographic emulsion might be converted to reflective indicia for purposes of checking registration. That is, a reflective coating could be placed upon the absorptive indicia, for example, by selectively sputtering aluminum thereon. Such techniques would be limited, however, to masks used in operations requiring a lesser degree of optical precision since any additional coating of the indicia would tend to decrease the preciseness of the boundary of each of the opaque areas forming the indicia.

Each of the indicia 14 may comprise an opaque band 15 surrounding a transparent circular area 16. The annular band configuration for the indicia is merely illustrative and other shapes may be used. The second mask of the set is shown in FIG. 3 and also comprises a transparent glass substrate 17 having a plurality of indicia 18 deposited thereon. Each of the indicia 18 comprises an opaque, ringlike bank 19 which surrounds a transparent circular area 22. The outside diameter of the bands 19 are slightly smaller than the inside diameter of the bands 15 (FIG. 2) of the first mask. The third mask of the set is shown in FIG. 4 and includes a transparent glass substrate 23 upon which a plurality of indicia comprising opaque circular areas 24 are deposited. The diameter of each of the circular areas 24 are slightly smaller than the inside diameter of the bands 19 (FIG. 3) of the second mask.

Figure 5:
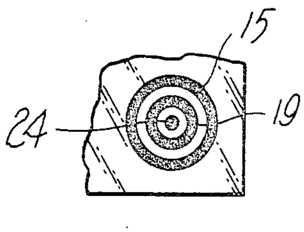
FIGS. 5 and 6 are views of the three masks showing proper registration of the respective shaded areas.
Figure 6:
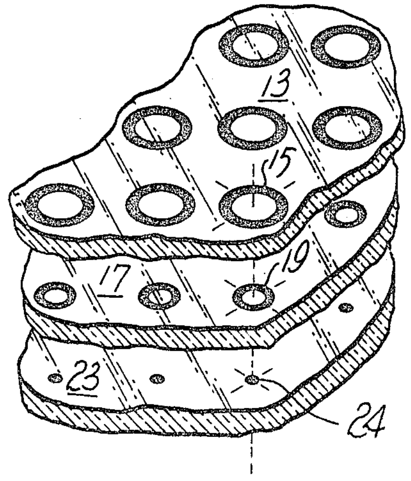

When, in the various photographic exposure steps the first, second and third masks are successively placed over the silicon slice and exposed, the areas covered by the successively used shaded bands 15, 19 and 24 should be in exact alignment. FIGS. 5 and 6 show views of how each one of the shaded bands 15, 19 and the shaded circular area 24 register within one another so that precise areas on a silicon slice are treated. When the masks in the set register exactly, each of the shaded bands 15 and 19 and the shaded circular area 24 will be precisely centered and concentric within one another.

Figure 7:
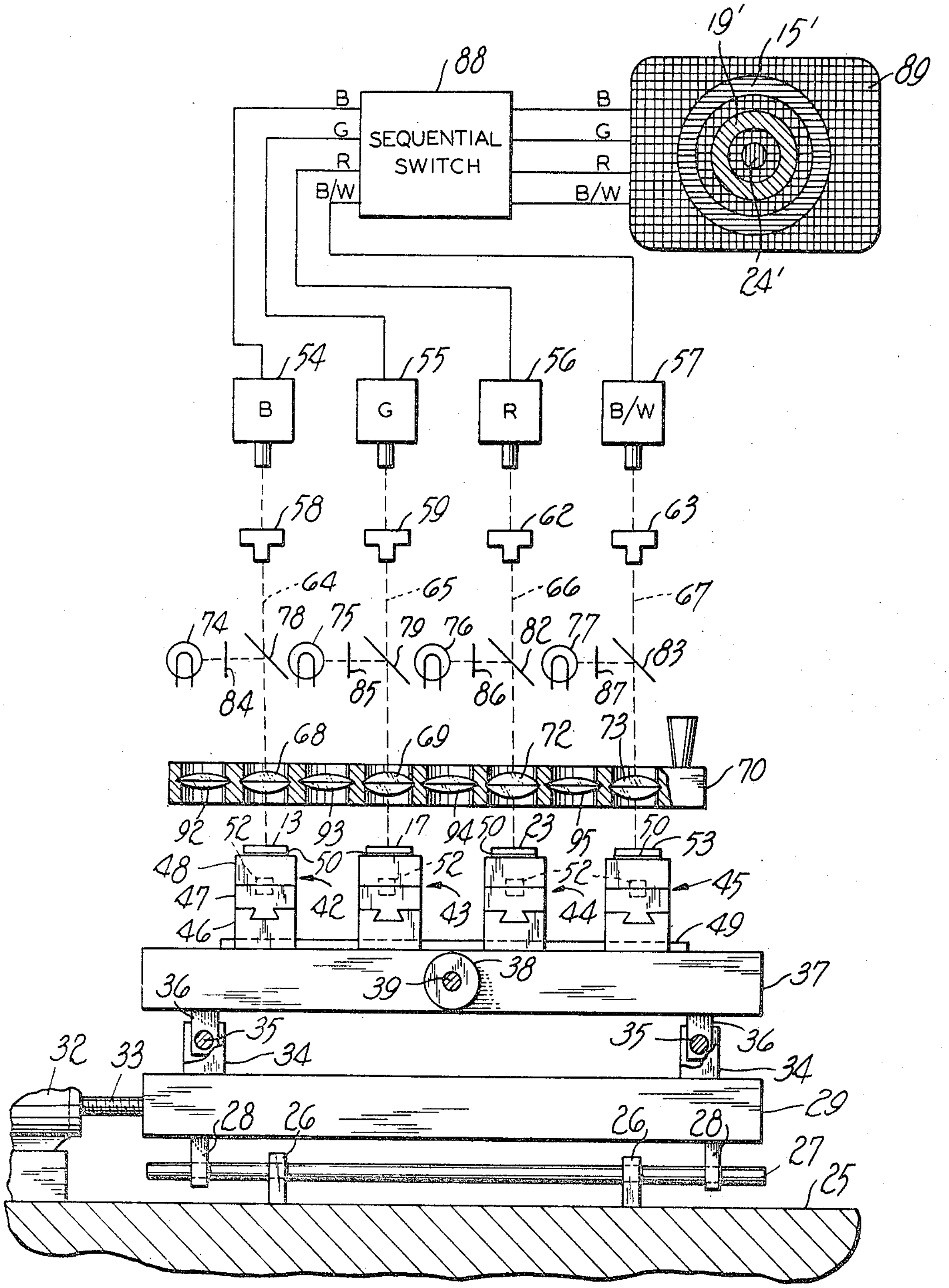
FIG. 7 is a schematic drawing of a mask registration checking system constructed in accordance with the invention.

FIG. 7 shows an illustrative view of the system for checking mask registration. The system comprises a fixed base 25 upon which two pairs of bearing blocks 26–26. Fixed to opposite ends of each of the support rods 27 are a pair of brackets 28–28 which are mounted to the underside of a first movable platform 29. An electric stepping motor 32 (the inertial mounting of which is not shown), including a screw threaded operating shaft 33 is attached to the platform 29. The motor 32 may be of the type TS52 stepping motor manufactured by the Superior Electric Co., of Bristol, Conn. It is to be understood that the stepping motor 32 is only illustrative of one means for moving the platform 29. When a very high degree of accuracy in indexing or greater automation is desired, other systems might be used such as the "slow-syn" type controlled indexer manufactured by the Superior Electric Co., of Bristol, Conn. Actuation of the cylinder moves the platform back and forth in discrete steps as the support rods 27 slide within the blocks 26–26.

Attached to the top of the first platform 29 is a second pair of bearing blocks 34–34. A second set of support rods 35–35 are slidably mounted within holes through the blocks 34–34. Opposite ends of the support rods 35–35 are fixed to a second set of brackets 36–36 which are mounted to a second movable platform 37. A second electric stepping motor 38, similar in type to the first motor 32, and a threaded operating shaft 39 are mounted to the first platform 29 (by means not shown), and are attached to the second platform 37 so that upon actuation of the motor 38 the platform 37 will move back and forth as the support rods 35–35 slide within the blocks 34–34. Since the support rods 27–27 are perpendicular to the guide arms 35–35, actuation of the motors 32 and 38 results in incremental movement of the second platform 37 in both the X and Y directions.

Mounted upon the upper surface of the second platform are four mask supporting pedestals 42—45. Each of the pedestals 42—45 comprises three cylindrical sections 46, 47 and 48. Referring to pedestal 42 as typical, the lowermost segment 46 has a dovetail groove formed in both its top and bottom surfaces, respectively, at right angles to one another. The bottom groove is mated with a dovetail tongue 49 which extends the width of the platform 37. The bottom dovetail mounting allows slight movement of the pedestal 42 to the left or right. The upper dovetail groove is mated to a corresponding dovetail tongue formed in the lower surface of the center segment 47. The upper dovetail joint allows the upper portion of the pedestal 42, segments 47 and 48, to move back and forth in a direction perpendicular to the dovetail tongue 49. The upper segment 48 is joined to the center segment 47 by means of an axial pin 52. The pin joint permits rotation of the upper segment 48 with respect to the lower segments 46 and 47. The three segment construction of each of the pedestals 42—45 permits freedom of movement of the upper segment of each pedestal in the X, Y and rotational directions.

Each of the three photographic masks 13, 17 and 23 of the set of masks to be checked for registration are mounted in a locating recess upon the upper segment of each of the pedestals 42, 43 and 44, respectively. A fourth mask 53, upon which a grid pattern is disposed, is mounted upon the fourth pedestal 45.

A layer of background material 50 is placed between each of the masks 13, 17, 23 and 53 and its respective pedestal.

For purposes of discussion it will first be assumed that masks 13, 17 and 23 are of the type having highly reflective opaque areas thereon. In the reflective case, the layers of background material 50 should contrast and be of a light absorptive material preferably having 80—90 percent absorptivity. Materials such as black anodized aluminum, black plastic, or a surface coated with a flat, black paint may be used.

A blank of television cameras 54—57 are mounted above and in alignment with the four pedestals. Each of the cameras are preferably a color camera and capable of resolving colored images into four separate electronic signals which correspond, respectively, to the colors blue, green, red and black/white found in the image. Four microscopic ocular lenses 58, 59, 62 and 63 are mounted, respectively, in the optical paths 64—67 of the television cameras. Four first objectives lenses 68, 69, 72, 73 are mounted in the respective optical paths of the cameras in a movable frame 70 so that when desired, a set of second objectives 92—95 may be moved into the optical paths. The first objectives 68, 69, 72, 73 provide for a closeup, narrow field of vision so that the cameras 54—57 view only individual shadow areas on the respective masks. The second objectives 92—95 provide for a wide field of vision so that the cameras 54—57 view the entire surface areas of the respective masks. Four lamps 74—77 are mounted above the objective lenses to shine down upon and illuminate the masks 13, 17, 23 and 53. Light from the lamps passes through a set of beam splitting mirrors 78, 79, 82, 83 and a series of color filters 84—87.

The highly reflective opaque areas on the masks 13, 17, 23 return substantially all of the light incident thereon back through the mirrors 78, 79, 82, 83 to the respective cameras 54—57.

The filters 84, 85, 86 are constructed, respectively, to only pass light of one of the primary colors blue, green and red. The fourth filter 87 is gray. For example, if an RCA L type 8572 color vidicon tube is used in the cameras 54—57, the peak color sensitivities occur at approximately the following wavelengths: 455 millimicrons (blue); 510 millimicrons (green); and 665 millimicrons (red). With this tube the following filters would be suitable for use as the filters 84, 85, 86 and 87, respectively; Kodak Wratten filters type numbers: 48 (blue), 55 (green), 29 (red) and "Kodak Pola-Screen" (gray).

Each of the television cameras 54—57 generates an electronic signal indicative of the image which it views through its respective ocular, 58—63. The television cameras, due to the color of light passing through the filters 84—87, each generate signals which correspond to the colors blue, green, red and black and white, respectively. The cameras are connected so that only the blue signal lead is used from the first camera 54, only the green signal is used from the second camera 55, only the red lead is used from the third camera 56 and only the black/white signal from the fourth camera 57 is used. Since a colored filter which passes a frequency of light to match the frequency sensitivity of the phosphor layer in each vidicon tube is sued with the light source for each camera, only the corresponding color responsive phosphor layer in the camera will produce a video signal. Theoretically, black and white television cameras might be used in each of the four camera positions. However, since additional interface circuitry might be required in order to connect the output of a black and white camera to the input of a color television monitor, four color cameras are employed and only one signal from each camera is used.

The selected output signal lead from each of the cameras 54—57 is connected to a sequential switch 88. Four separate outputs, also corresponding to the three primary colors and black and white, are connected from the sequential switch 88 to a color television monitor 89. The presence of a video signal on one of the four input leads of the monitor 89, results in the generation of an image on the display screen of the monitor 89. The color of the image displayed on the screen corresponds to the particular input leads which is energized. That is, when a video signal is impressed upon the "blue" input lead of the monitor 89 the image on the screen will appear entirely blue; likewise, energization of the "green" input lead alone will result in an entirely green image being displayed on the screen of the monitor 89. The sequential switch 88 operates to sequentially connect the leads from the cameras 54—57 to the corresponding input leads of the monitor 89. The connection of each lead is maintained long enough for one complete image to be generated by the monitor 89. That is, the electronic signal from camera 54 (blue signal lead) is connected to the "blue" input lead and one complete blue image from the camera 54 is displayed on the screen of the monitor 89. Next, the image viewed by the camera 55 (green signal lead) is connected to the "green" input lead and a complete green image from the camera 55 is displayed on the screen of the monitor 89. Similarly, the image viewed by the camera 56 is displayed as a red image on the screen, and the grid pattern viewed by camera 57 is displayed as black and white on the screen of the monitor 89.

OPERATION

Initially, the photographic masks 13, 17 and 23 to be checked for registration are mounted to the pedestals 42, 43 and 44 with the layers of background material 50–50 interposed therebetween. The mask 53 having a gridlike pattern is mounted onto the fourth pedestal 45. The lamps 74—77 are energized to illuminate the surfaces of the four masks through the respective filters 84—87 and the half-silvered mirrors 78, 79, 82 and 83. The movable frame 70 is shifted to move the second objective lenses 95—95 into the optical paths 64—67, so that the cameras 54—57 view the masks 13, 17, 23 and 53 through the lenses 92—95 and the microscope oculars 58, 59, 62, 63. The television cameras 54—57 now view a complete image of the entire surface areas of the masks. Through the action of the sequential switch 88, described above, complete images of all four masks are displayed on the screen of the monitor 89.

The alignment mark 12 (FIG. 1) of each of the masks 13, 17, 23, 53 are to be initially aligned on the face of the screen by moving the three segments 46, 47, 48 of each of the pedestals. The segments 46, 47, 48 are moved so that each of the four masks 13, 17, 23, 53 are in exact initial alignment on the fact of the monitor 89. Additionally, the X- and Y-axes of the masks 13, 17, 23 and 53 are aligned by rotating the segments 48–48 so that they correspond, respectively, with the X- and Y-axes of the platforms 29 and 37. Micrometers (not shown) may be connected to the segments 46, 47 and 48 to facilitate precise positioning of the masks. For example, a micropositioner might be used such as the Model A Micropositioner manufactured by the Line Tool Co., of Allentown, Pa.

After initial alignment, the movable frame 70 is shifted back to its original position so that the first objective lenses 68, 69, 72, 73 are moved back into the optical paths 6 64—67. The focus and magnification of the first objectives 68, 69, 72, 73 and the oculars 58, 59, 62, 63 are adjusted so that the cameras 54—57 generate images of individual shadow patterns on the masks which are large enough to fill the entire display screen of the monitor 89. The platforms 29 and 37 are shifted in the X and Y directions respectively, by means of the stepping motors 32 and 38, so that corresponding selected areas on the masks are brought into view on the display screen. Since the masks have been initially aligned and individual areas on each have been selected for viewing, the composite image of the set of the masks is generated as follows.

The camera 54 views the reflective ringlike opaque area 15 on the first mask 13 and the electronic signal generated by the camera 54 is initially connected to the "blue" input lead of the monitor 89. An image of the opaque band 15′ is generated on the face of the screen and is of a blue color. The reflective ringlike opaque area 19 on the second mask 17 is viewed by the camera 55 and the electronic signal therefrom is connected to the "green" input lead of the monitor 89 and an image 19′ is generated on the display screen and is colored green. The camera 56 views the reflective circular opaque area 24 on the third mask 23 and generates an electronic signal which is connected to the "red" input lead of the monitor 89 and an image 24′ is displayed on the face of the screen and is red in color. As was pointed out above, the dwell time of the switch 88 is such that each of the images 15′, 19′, 24′ are generated sequentially, each during one complete frame on the monitor screen. Due to the persistence of vision in the eye. the viewer sees a composite, multicolor, image of the corresponding shaded areas of all three masks in the set. Any overlay, distortion, nonconcentricness or any other form of misregistration of the three areas will be immediately apparent. Superposition or overlay of two or more opaque areas will produce a different color which is the combination of the two overlapping colors.

Initially it was assumed, for purposes of explanation that the masks to be checked for registration were of the type having reflective opaque areas. Masks with substantially absorptive opaque areas are inspected in a similar manner. First, each of the three masks 13, 17 and 23 of the set of masks to be checked for registration and the grid mask 53 are mounted in the locating recess upon the upper segment of each of the respective pedestals 42, 43, 44 and 45 with an interposed layer of background material 50 under each mask. Since the masks being inspected have opaque areas of absorptive material, the background material 50 should contrast and be of a highly reflective material such as a front mirrored surface.

As colored light from the lamps 74—77 and the filters 84—87 impinges upon the surfaces of the masks 13, 17 and 23, the light is absorbed by the opaque areas and reflected by the layer of background material. As each of the television cameras 54—57 views its respective mask, it "sees" a dark ring surrounded by a colored background. That is, the camera 54 views the absorptive ringlike opaque area 15 of the first mask 13 on its reflective background 50 and the electronic signal generated by the camera 54 is initially connected to the "blue" input lead of the monitor 89. An image of the opaque bank 15′ is generated on the face of the screen and is black in color surrounded by a blue background. The absorptive ringlike opaque area 19 on the second mask is viewed by the camera 55, the electronic signal therefrom is connected to the "green" input lead of the monitor 89 and the image 19′ is generated on the display screen and is colored black on a green background. The camera 56 views the absorptive circular opaque area 24 on the third mask 23 and generates an electronic signal which is connected to the "red" input lead of the monitor 89 and an image 24′ is displayed on the face of the screen and is black in color on a red background.

Since the dwell time of the switch 88 is such that each of the images 15′, 19′, and 24′ are generated sequentially, each during one complete frame on the monitor screen, the viewer sees a composite, multicolor, image of the opaque areas of all three masks due to persistence of vision in the eye. That is, the image 15′ will be of a yellow-orange color since the green and red backgrounds will be reflected and their colors combined to form the image 15′ while images 19′ and 24′ are being displayed. The blue background will be excluded from the area of image 15′ because the opaque area 15 is absorptive and appears black on the display screen. Similarly, the image 19′ will appear indigo in color due to the combination of the red and blue backgrounds and blockage of green light by the absorptive opaque areas 19. Likewise the image 24′ will appear turquoise in color from the combination of the green and blue backgrounds and the absence of red light in the area 24′. Any overlap due to misregistration will appear as a discolored area within one of the images 15′, 19′, or 24′ since a fraction of the incident colored light will be absorbed by the overlapping portion of the misaligned opaque area.

A further, third embodiment of the invention may be employed in the limited circumstance in which there are substantially large transparent spaces between the opaque rings 15, 19, and 24 when they are in proper registration, such as shown in FIG. 5. In this situation, black and white television cameras and a black and white display screen may be used since there is no need to detect the degree of overlap in the opaque areas. That is, any overlap at all would be sufficient error to reject the entire set of opaque areas.

When one area of the set of masks has been checked for registration, the movable platforms 29 and 37 may be systematically stepped to inspect the remainder of the mask areas by actuation of the stepping motors 32 and 38. The gridlike pattern of mask 53 which is displayed in black and white by means of the camera 57, enables the viewer to determine the degree of misregistration of the mask areas and permits measurement of individual features on the masks, such as, the diameters of the opaque areas. This permits the operator to make a decision as to whether the masks in the set conform to predetermined tolerance values.

It is to be understood that the above-described embodiments are simply illustrative of the invention and that many others embodiments are simply illustrative of the invention and that many other embodiments can be devised without departing from the scope and spirit of the invention.

I claim:

1. A method for checking the registration of a pattern on a first medium with a pattern on a second medium, the steps comprising:
mounting the first medium in a lateral spaced relationship to the second medium;
generating a first color electronic image signal of the first medium;
generating a second color electronic image signal of the second medium;
displaying an image of the pattern on the first medium in superimposed relationship to an image of the pattern on the second medium, the image of the pattern on the first medium projecting the first color, and the image of the pattern on the second medium projecting the second color; and
aligning the image of the first medium with the image of the second medium in a predetermined congruent relationship to check the registration of the pattern on the first medium with the pattern on the second medium.

2. In a method for checking registration of a plurality of spaced sets of indicia on a first medium with a plurality of spaced sets of indicia on at least a second medium, the steps comprising:
individually mounting the first medium in laterally spaced relationship to the second medium;
generating a first color electronic image signal of the first medium and a second color electronic image signal of the second medium;
displaying an image of the sets of indicia on the first medium in a superimposed relation to an image of the sets of indicia on the second medium so that the image of the sets on the first medium projects the first color and the image of the sets on the second medium projects the second color;
aligning the image of one set of indicia on said first medium in an initial predetermined superimposed relationship with a corresponding image of one set of indicia on the second medium; and
simultaneously moving the first and second mediums in the same direction to sequentially display the entire pattern of indicia on the first medium in superimposed relation to the entire pattern of indicia on the second medium to check the registration of the entire pattern of indicia on the first medium with the entire pattern of indicia on the second medium.

3. A method for checking the degree of registration of patterns of photographic masks, comprising:
mounting a plurality of said photographic masks in positions relatively spaced from one another;
illuminating the surface of each of the masks with light from a respective different color;
generating a color electronic image signal indicative of each mask to project an image of the associated pattern;
aligning a predetermined fixed point on the image of one mask with a predetermined fixed point on the image of the other masks so that the masks are congruently disposed; and
displaying the images of the pattern generated by the electronic signal to show a composite image of all the individual patterns on the masks, the image of the respective pattern distinguished by the different color, to determine the degree of registration of the patterns.

4. A method for checking the degree of registration of a pattern on a plurality of photographic masks, comprising:
supporting a plurality of photographic masks in alignment with respective optical paths of a plurality of color television cameras;
mounting the masks for movement to position a fixed point of each mask in the optical path of said cameras;
generating an electronic image signal of a different color from each of the cameras indicative of the appearance of the pattern on the associated masks;
connecting the output signals from said cameras to predetermined inputs of a television receiver to display a composite, multicolored image of corresponding fixed points on each mask positioned in the optical paths of said cameras, said multicolored image generated as the different color for each mask;
aligning the fixed point of a first mask into coincidence with the fixed point of the other masks so that the masks are congruently disposed; and
displaying a composite, multicolored image of the remaining areas on said masks to check the registration of the pattern on the first mask with the pattern of the other masks.

5. A method for checking the degree of registration of a pattern on a first photographic mask with a pattern on a second photographic mask, the masks mounted in spaced relationship, comprising:
supporting said first mask in the optical path of a first camera having an output for generating a first color and supporting said second mask in the optical path of a second camera having an output for generating a second color;
mounting said masks for movement to position selected predetermined areas on said masks in the optical paths of said cameras;
directing light of said respective first and second colors onto said respective first and second masks to illuminate said masks with said respective first and second colors;

connecting the outputs of said cameras to respective first and second inputs of a color television receiver to display images of said first and second colors, respectively, to exhibit a composite, two color image of said preselected mask areas;

moving each of said masks to bring the respective selected areas of each of said masks into a fixed relationship on said receiver; and displaying the remaining areas of said masks on said receiver to exhibit a composite two color image of the patterns of said mask areas to show their degree of registration.

6. A method for checking the degree of registration of a pattern on a first photographic mask with a pattern on a second photographic mask, the masks mounted in spaced relationship, comprising:

supporting said first mask in the optical path of a first camera and supporting said second mask in the optical path of a second camera, the respective first and second cameras having an output for generating a respective first and second color;

mounting said first and second masks for movement to position selected areas on said masks in the optical paths of said cameras;

projecting an image from said selected areas on said masks indicative of the color of the masks to said respective cameras;

connecting the outputs of said cameras to first and second inputs, respectively, of a color television receiver to generate a composite, two color image of said mask areas;

moving first lenses into the optical paths of said cameras to display an image of the entire surface area of said masks on said receiver, said displaying enabling the initial alignment of said first and second masks; and moving second lenses into the optical paths of said cameras to change the focal lengths thereof to display an image of selected areas of said masks on said receiver, said display indicating the degree of registration of the pattern on said fist first mask with the pattern on said second mask.

7. In a method for checking the registration of a plurality of spaced, discrete patterns on a multitude of transparencies;

individually supporting the multitude of transparencies in a multitude of holders;

mounting each holder for rotational movement and for translatory movement in X and Y directions;

mounting all said holders for simultaneous movement in X and Y directions;

directing a multitude of television cameras individually at said holders, each camera generating a different color electronic image signal from a respective holder;

connecting each of the cameras to a color television set to display the different colored images as a composite on the receiver;

interposing optical systems between each camera and each holder for projecting images of the entire transparencies mounted in each of said holders onto said cameras, each image projected as a different color, to align predetermined areas of the transparencies in a fixed relationship; and moving an auxiliary optical device into registration with said optical systems for projecting images of each discrete pattern on the transparencies onto said cameras, each pattern projected as a different color, to check the registration of the pattern on each of the transparencies with the pattern on the respective other transparencies.

UNITED STATES PATENT OFFICE
CERTIFICATE OF CORRECTION

Patent No. 3,555,172 Dated January 12, 1971

Inventor(s) Alfred Heinz

It is certified that error appears in the above-identified patent and that said Letters Patent are hereby corrected as shown below:

Column 3, line 15, cancel "bank" and insert --band--.
Column 3, line 37, after 26-26 insert --are mounted (only one pair is shown). A support rod 27 is slidably mounted within plain bearings passing through each of the pair of blocks 26-26--.
Column 4, line 31, cancel "blank" and insert --bank--.
Column 4, line 59, after RCA cancel "L".
Column 5, line 4, cancel "sued" and insert --used--.
Column 6, line 3, after paths cancel "6".
Column 10, line 6, claim 6, before first cancel "fist".

Signed and sealed this 21st day of December 1971.

(SEAL)
Attest:

EDWARD M.FLETCHER,JR.
Attesting Officer

ROBERT GOTTSCHALK
Acting Commissioner of Patent